(12) United States Patent
Hager et al.

(10) Patent No.: US 6,323,441 B1
(45) Date of Patent: Nov. 27, 2001

(54) ULTRASONIC DISTANCE MEASURING SYSTEM FOR MONITORING RAILROAD CAR LOADS

(75) Inventors: James Robert Hager, Golden Valley; Curtis James Petrich, Minneapolis; Thomas Richard Jicha, Elk River, all of MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/522,813

(22) Filed: Mar. 10, 2000

(51) Int. Cl.[7] .................. G01G 9/00; G01G 19/08; G01S 15/00
(52) U.S. Cl. .......................... 177/1; 177/136; 177/210 R; 367/99; 367/908; 702/174; 238/1; 105/463.1
(58) Field of Search ............ 367/99, 908; 177/136, 177/137, 138, 139, 210 R, 1; 702/173, 174; 238/1; 105/463.1

(56) References Cited

U.S. PATENT DOCUMENTS

| | | | |
|---|---|---|---|
| 3,428,139 | * 2/1969 | Nolan | 177/137 |
| 3,508,623 | * 4/1970 | Greenstein | 177/137 |
| 4,000,650 | * 1/1977 | Snyder | 367/908 |
| 4,162,473 | * 7/1979 | Utasi | 340/1 L |
| 4,202,049 | * 5/1980 | Wetzel | 367/908 |
| 4,623,029 | * 11/1986 | Bambauer et al. | 177/137 |
| 4,675,854 | * 6/1987 | Lau | 367/908 |
| 4,944,335 | * 7/1990 | Stembridge et al. | 367/908 |
| 5,016,200 | * 5/1991 | Passarelli | 177/136 |
| 5,184,733 | * 2/1993 | Arnarson et al. | 177/1 |
| 5,568,449 | * 10/1996 | Rountree et al. | 367/99 |
| 5,603,556 | 2/1997 | Klink | 303/22.6 |
| 5,735,580 | * 4/1998 | Klink | 303/22.6 |
| 5,793,705 | 8/1998 | Gazis et al. | |
| 5,822,275 | * 10/1998 | Michalski | 367/99 |
| 5,900,535 | 5/1999 | Doe | |
| 5,900,546 | 5/1999 | Wilkins | |
| 5,910,929 | * 6/1999 | McConnell et al. | 367/96 |
| 6,006,868 | * 12/1999 | Klink | 188/1.11 W |
| 6,273,521 | * 8/2001 | Halvorson et al. | 303/7 |

FOREIGN PATENT DOCUMENTS

| | | |
|---|---|---|
| 0 429 687 A1 | 6/1999 | (EP) . |
| WO 97/18979 | 5/1997 | (WO) . |
| WO 99/24794 | 5/1999 | (WO) . |

* cited by examiner

Primary Examiner—Randy W. Gibson
(74) Attorney, Agent, or Firm—Kris T. Fredrick

(57) ABSTRACT

An ultrasonic distance measuring system for monitoring railroad car loads. The system includes an ultrasonic transducer, a pulse generation and detection circuit and a measurement circuit. The transducer produces a transmitted ultrasonic pulse beam to be directed at a load in a railroad car and receives a return pulse beam from the load. The pulse generation and detection circuit is coupled to the transducer and causes the transducer to produce the transmitted pulse beam. A return pulse beam is detected by the pulse generation and detection circuit. The measurement circuit is coupled to the pulse generation and detection circuit and generates a measurement signal representative of the load as a function of the time delay between the transmitted and return pulse beams.

9 Claims, 4 Drawing Sheets

ULTRASONIC DISTANCE MEASURING SYSTEM FOR MONITORING RAILROAD CAR LOADS

FIELD OF THE INVENTION

The present invention relates generally to systems for measuring the loads in railroad cars. In particular, the present invention is an ultrasonic system for measuring information representative of railroad car loads.

BACKGROUND OF THE INVENTION

The sizes of the loads transported by railroad cars can vary widely. By way of example, although they are often loaded with up to several tons of goods or material, they are also sometimes transported empty after the loads have been delivered. For this reason, and since the amount of braking force required to stop a railroad car is dependant upon the size of the load being transported, railroad cars typically include load weight sensors. The load weight sensors provide information representative of the car load to the brake system, thereby enabling the brake system to apply braking forces appropriate for the load being transported.

Pneumatic (i.e., air actuated) brake systems are widely used on railroad cars. The load weight sensors commonly incorporated into these systems are mechanically actuated valves for regulating the amount of air applied to the brakes as a function of the measured load. The valves are mounted across the suspension springs between the car body and wheels, and effectively regulate the brake air flow as a function of the compression of the suspension springs (e.g., the greater the weight the more the more the springs are compressed and the valve opened to allow greater air flow to the brakes). These mechanical load weight sensors are, however, relatively expensive to maintain.

Ultrasonic systems for monitoring railroad car loads have also been developed. These systems were mounted to the outside of the car and measure suspension spring compression (e.g., load) by monitoring the distance between the car body and the railroad track or ground. Unfortunately, the accuracy of these ultrasonic systems can be less than desirable since a relatively wide ultrasonic beam is required to make the systems operable over a range of railroad car speeds and directions. Noise generated by the wheels on the rails can also interfere with the operation of the systems. They are also susceptible to damage from debris.

It is evident that there is a continuing need for improved load weight sensors for use in rail car applications. To be commercially viable the system should be accurate and efficient to manufacture and maintain. A system of this type would be especially desirable if it were capable of being interfaced to the electronic air brake systems (EABS), also known as electronically controlled pneumatic (ECP) brake systems, being incorporated into railroad cars.

SUMMARY OF THE INVENTION

The present invention is an accurate and efficient-to-manufacture ultrasonic distance measuring system which can be effectively used to measure railroad car load weights. The electronic system can also be easily incorporated into electronic air brake systems. One embodiment of the invention includes an ultrasonic transducer for producing a transmitted ultrasonic pulse beam, a pulse generation and detection circuit and measurement circuit. The transducer directs the transmitted pulse beam to a load in a railroad car and receives a return pulse beam from the load. The pulse generation and detection circuit is coupled to the transducer, causes the transducer to produce the transmitted pulse beam and detects the return pulse beam. The measurement circuit is coupled to the pulse generation and detection circuit and generates a measurement signal representative of the load as a function of the time delay between the transmitted and return pulse beams.

DETAILED DESCRIPTION OF THE PREFERRED EMBODIMENTS

Figure 1:
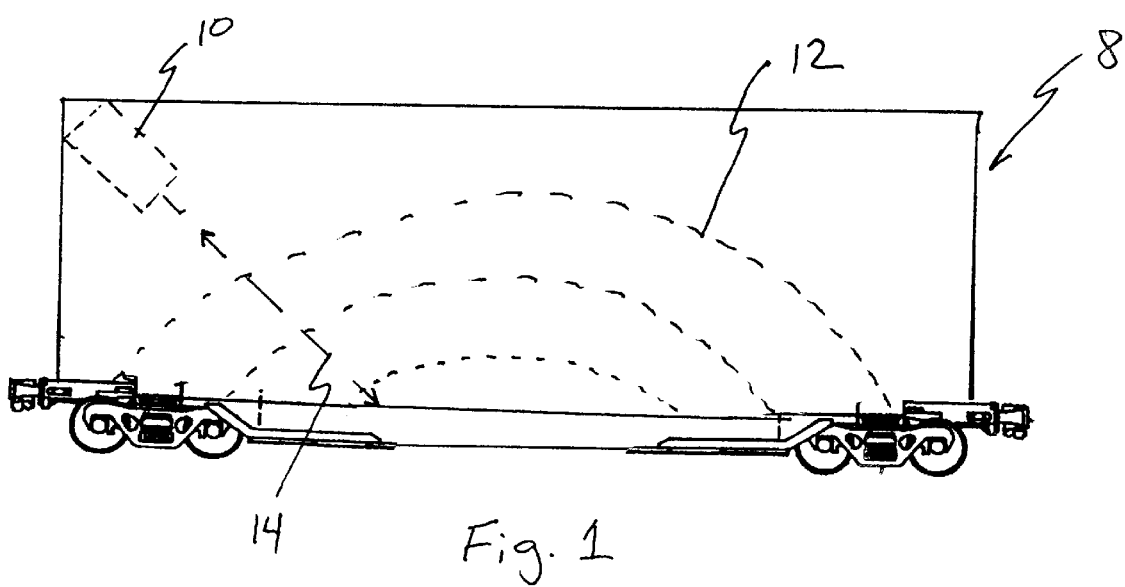
FIG. 1 is a diagrammatic illustration of a railroad car including an ultrasonic distance measuring system in accordance with the present invention for monitoring the car load.

A railroad car 8 including an ultrasonic distance measuring system 10 for monitoring the load 12 in the car is shown generally in FIG. 1. System 10 emits an ultrasonic pulse beam 14 which is directed into the car 8 to a location at which the load 12 is expected to be present. The beam 14 is reflected or otherwise directed back to the system 10. The system 10 then processes the received beam 14 to generate a range information signal (i.e., a distance measurement signal) representative of the distance traveled by the beam (i.e., as a function of the time delay between transmission and receipt of the pulses). In the application described herein, the distance traveled by the beam is representative of the size, and therefore weight, of the load. Although not shown, ultrasonic system 10 can be interfaced to an electronic air brake system (EABS), and the load information generated by the system used to control the application of braking force to the railroad car 8.

Figure 2:
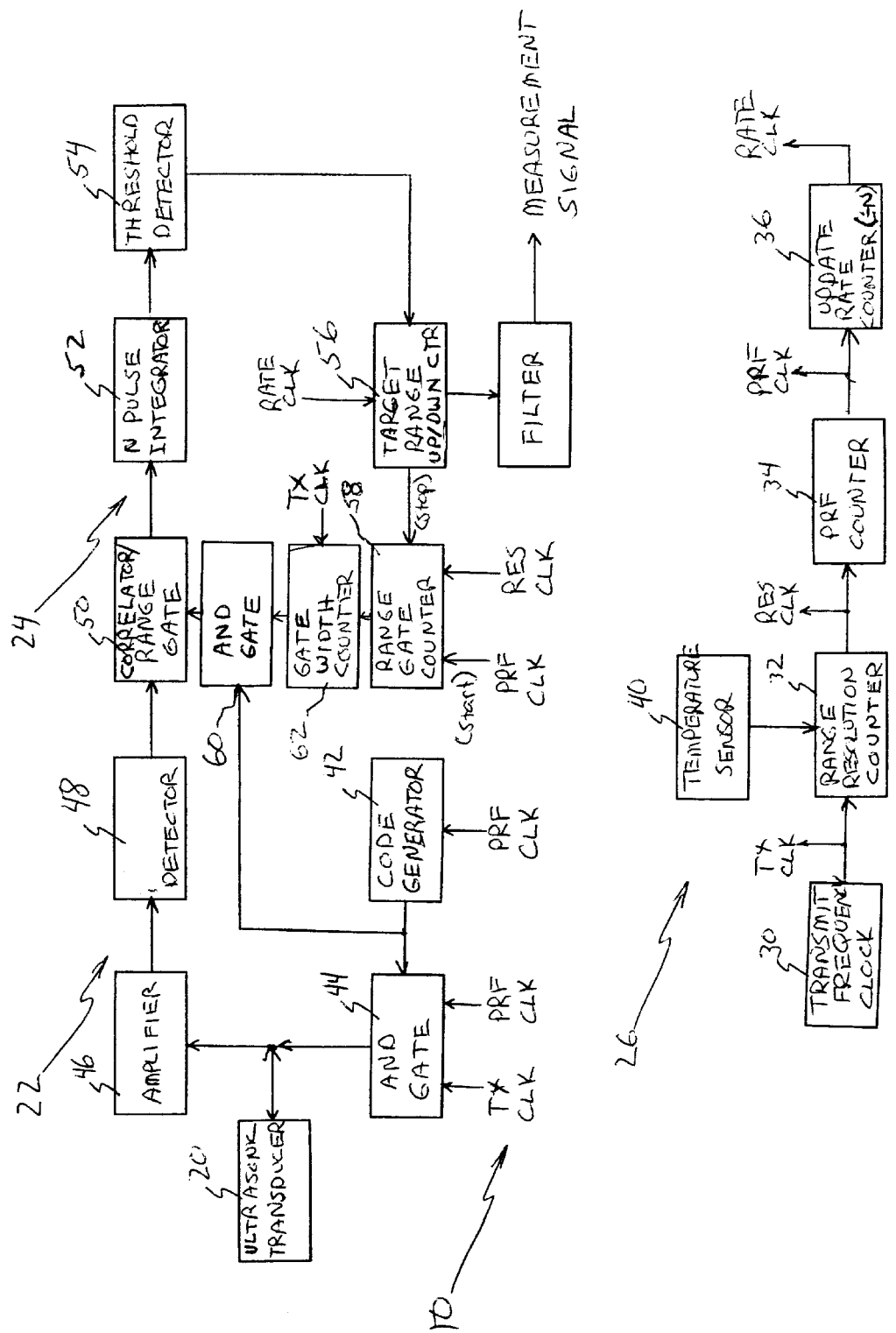
FIG. 2 is a block diagram of the ultrasonic distance measuring system shown in FIG. 1

FIG. 2 is a block diagram of the ultrasonic distance measuring system 10. As shown, the system 10 includes an ultrasonic transducer 20, pulse generation and detection circuit 22, range gate positioning circuit 24 and timing circuit 26. The timing signals used by the pulse generation and detection circuit 22 and the range gate positioning circuit 24 are generated by the timing circuit 26. These timing signals include a transmit frequency clock signal TX CLK generated by clock circuit 30, a range resolution clock signal RES CLK generated by counter 32, a pulse rate frequency clock signal PRF CLK generated by counter 34 and a rate clock signal RATE CLK generated by counter 36. The transmit frequency clock signal TX CLK is the highest frequency signal generated by clock circuit 26, and is the frequency of the ultrasonic signal generated by transducer 20. 100 KHzis a typical frequency for signal TXCLK, although other ultrasonic frequencies selected to optimize the ultrasonic system 10 for particular applications can also be used. In the embodiment shown, counters 32, 34 and 36 are all connected in series with one another from the transmit frequency clock circuit 30, and thereby produce respective clock signals RES CLK, PRF CLK and RATE CLK at frequencies which are integer fractions of the frequency of the signal TX CLK.

The clock signal RES CLK establishes the measurement resolution accuracy of the ultrasonic system 10, and can be set to levels appropriate for the application of the system. For example, resolutions on the order of 1 foot can be obtained by the use of clock signals RES CLK in the range of 500 Hz, while resolutions on the order of 1 inch can be obtained by the use of signals RES CLK in the range of 6000 Hz.

Figure 3:
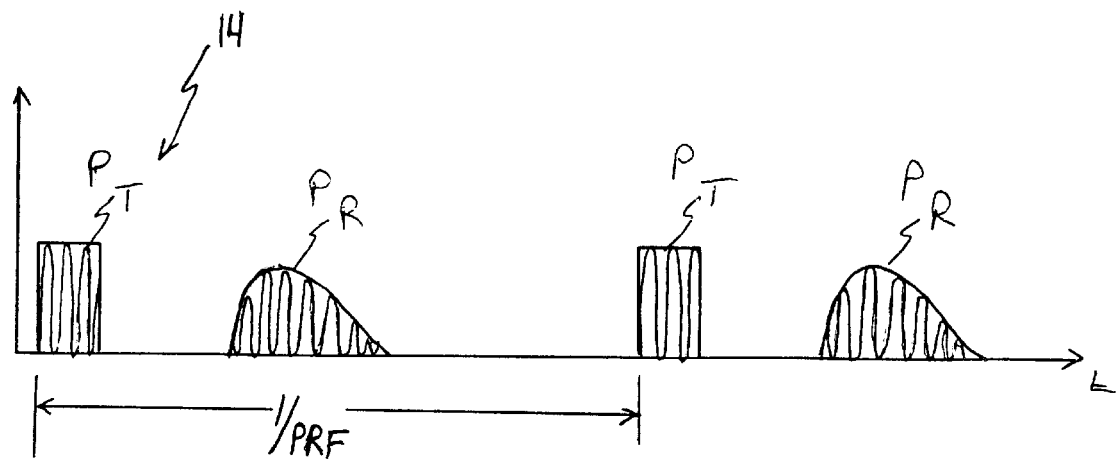
FIG. 3 is a diagram (not to scale) of the ultrasonic pulse beam produced by the system shown in FIG. 2.

FIG. 3 is a diagrammatic illustration of the ultrasonic pulse beam 14 transmitted by the system 10. The beam 14 is formed by a series of pulses $P_T$ and $P_R$ In this diagram the pulses $P_T$ represent the transmitted pulses as they are emitted from the transducer 20, while the pulses $P_R$ are the return pulses reflected off the load 12 and directed back to the ultrasonic system 10. The transmitted pulses $P_T$ are separated by pulse repetition intervals (PRI) corresponding to the frequency of the signal PRF CLK (i.e., PRI=1/frequency of PRF CLK). Pulses $P_R$ and $P_T$ are formed by a burst of (i.e., by on-off key modulating) the transmit frequency signal TX CLK. The length of the transmit pulses $P_T$ is controlled by and corresponds to the width of the PRF CLK signals, and can be in the range of 0.1 msec to 2 msec, although other pulse lengths suitable for the particular application of the system 10 can also be used. As illustrated diagrammatically in FIG. 3 (not to scale), the return pulses $P_R$ tend to loose amplitude and lengthen during propagation. The pulse repetition interval should be greater than the time it will take the transmitted pulses $P_T$ to traverse the longest expected distance before returning as return pulses $P_R$ (e.g., when no load 12 is present in the application shown in FIG. 1) to minimize interference between the pulses.

Referring again to FIG. 2, and as described in greater detail below, the clock signal RATE CLK produced by counter 36 is used to control the speed at which the range gate positioning circuit 24 operates. In particular, the range gate positioning circuit 24 processes groups of a predetermined number (N) of pulses from the beam 14 in the course of generating the range information signal. The clock signal RATE CLK corresponds to and effectively establishes the number N by generating a rate clock pulse for every N PRF CLK signal pulses.

The speed at which the pulses of the beam 14 travel through the air is very dependant upon the temperature of the air. To compensate for these temperature effects, system 10 includes a temperature sensor 40 for providing information representative of the current temperature. On the basis of the temperature information provided by sensor 40, ultrasonic system 10 can compensate for the associated propagation speed effects and provide accurate range information signals. In the embodiment shown, the temperature sensor 40 is coupled to the RES CLK counter 32, thereby causing the frequency of the clock signals RES CLK, PRF CLK and RATE CLK to be adjusted with respect to the clock signal TX CLK to provide the temperature compensation function. Other temperature compensation approaches can also be used.

Figure 4:
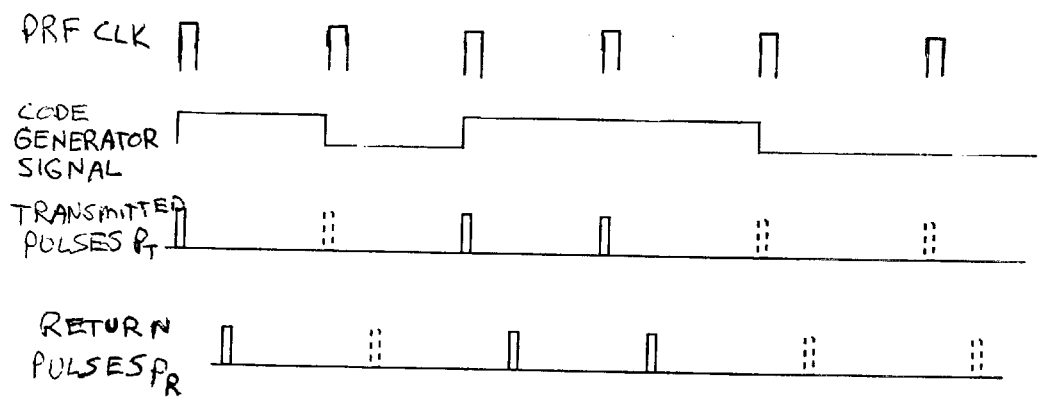
FIG. 4 is a timing diagram illustrating the relative timing of several clock signals and the pulse beam generated by the system shown in FIG. 2.

Pulse generation and detection circuit 22 includes code generator 42, logic AND gate 44, amplifier 46 and peak detector 48. Code generator 42 is connected to receive clock signal PRF CLK and produces a pseudo-random enable signal. In particular, and as shown in FIG. 4, the enable signal produced by the code generator 42 pseudo-randomly switches logic states when triggered by the clock signal PRF CLK.

The enable signal from code generator 42 is applied to AND gate 44 along with the TX CLK and PRF CLK clock signals. The output of the AND gate 44 is a drive signal causing the ultrasonic transducer to produce transmitted pulses $P_T$ of the beam 14. As shown in FIG. 4, AND gate 44 initiates the generation of pulses $P_T$ only when the clock signal PRF CLK occurs and the enable signal outputted by the code generator 42 is at a logic 1 state. As described below, the range gate positioning circuit 24 is also coupled to the code generator 42, and is controlled to detect return pulses $P_R$ only following the transmission of pulses $P_T$. This pseudo-random transmission of the beam 14 and corresponding detection windowing enhances the immunity of the system 10 from interference such as that from similar systems on nearby railroad cars and stray noises (e.g., railroad car wheel noise).

The return pulses $P_R$ received by the transducer 20 are amplified by amplifier 46 and applied to detector 48. The detector 48 produces envelope signals representative of the envelope of the return pulses $P_R$ of the beam 14. The detected envelope signals from detector 48 are coupled to the range gate positioning circuit 24. Range gate positioning circuit 24 includes correlator/range gate 50, pulse integrator 52, threshold detector 54, target range counter 56, gate positioning counter 58, gate width counter 62 and logic AND gate 60. The gate positioning circuit 24 generates a gate pulse which controls the time period during which each return pulse $P_R$ is processed. In effect, and as described below, the position of the gate pulse generated by circuit 24 is controllably shifted in time with respect to the transmit pulses $P_T$ to identify the location of the return pulses $P_R$. The range information signal is then determined as a function of the position of the gate pulse.

Figure 5:
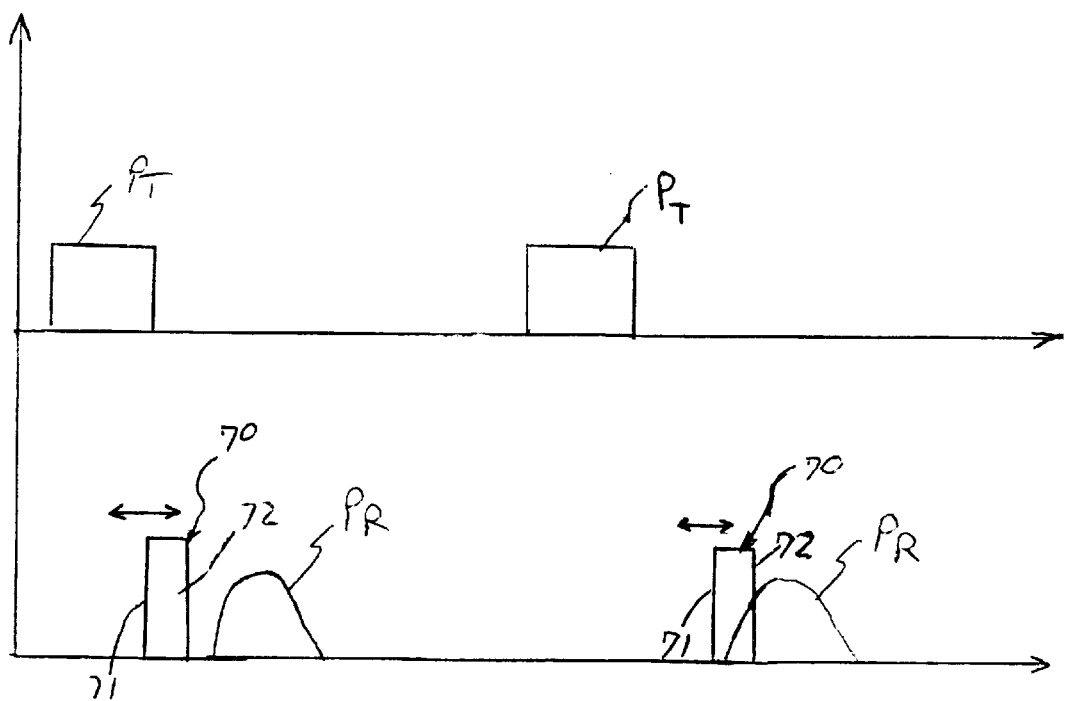
FIG. 5 is an illustration of the pulse beam and range gate pulses generated by the systems shown in FIG. 2.

FIG. 5 is a graphical representation of the gate pulses 70 produced by range gate positioning circuit 24, and the timing interrelationships between the gate pulses and the transmitted pulses $P_T$ and return pulses $P_R$ of the ultrasonic pulse beam 14. As shown, the gate pulses 70 have a leading edge 71 and a trailing edge 72. The position of the gate pulses varies and is related to the measured distance.

The gate pulses 70 are produced by the combined operation of the gate positioning counter 58 and gate width counter 62, and applied to the AND gate 60. As shown in FIG. 2, the PRF CLK clock signal is applied to the gate positioning counter 58 and effectively functions as a start signal by causing the counter to start counting the RES CLK pulses. After the counting is started, the gate positioning counter 58 counts up until the count reaches the count of the range signal received from the target range counter 56. The range signal outputted from the target range counter 56 is a number representative of the measured distance between the system 10 and load 12, and effectively functions as a stop signal. When the count of the gate positioning counter 58 reaches the count represented by the range signal, the gate positioning counter produces a pulse which causes the gate width counter 62 to start the gate pulse 70 with the leading edge 71. At the same time that the gate width counter 62 produces the leading edge 71 of the gate pulse 70, the gate width counter counts at the rate of the TX CLK signal to a predetermined value corresponding to the desired width of the gate pulse. After the count of the gate width counter 62 reaches predetermined value, the gate width counter terminates the gate pulse 70 with trailing edge 72. Preferably, the gate width counter 62 causes the width of the gate pulses 70 to be less than the width of the transmitted pulses $P_T$.

The range gate pulses 70 produced by the operation of positioning counter 58 and width counter 62 are applied to AND gate 60 along with the enable signal produced by the code generator 42. The range gate pulses 70 are therefore transmitted to correlator/range gate 50 only when the transmitted pulses $P_T$ were initiated by the AND gate 44 in the manner described above. The AND gate 60 therefore causes the range gate positioning circuit 24 to process signals (e.g., the return pulses $P_R$) only after the transmission of pulses $P_T$ to enhance interference immunity.

Correlator/range gate 50 functions as a switch controlled by the range gate pulses 70. During the period of time between the leading edge 71 and trailing edge 72 of the range gate pulses 70 (i.e., when the range gate pulse is on) the correlator/range gate 50 transmits the detected return pulse envelope signals from detector 48 to the integrator 52. Integrator 52 integrates (e.g., effectively adds) the gated return energy of N sequentially detected pulses $P_R$. The integrated energy value from integrator 52 is then compared to a predetermined threshold value at threshold detector 54.

The predetermined threshold value used by detector 54 is a value which corresponds to the desired range gate pulse 70 overlap with the return pulse $P_R$. If the integrated energy value from integrator 52 is less than the threshold value, the position of the range gate pulses 70 was too early (i.e., was present before the return pulses were detected), preventing the integrated energy value of the preceding N detected pulses $P_R$ from reaching the threshold value. This event occurs when the measurement distance represented by the position of the range gate pulses 70 (i.e., the range signal outputted from counter 56) is less than the actual distance being measured. In response to a received integrated energy value which is less than the threshold value, the threshold detector 54 outputs a count direction signal which causes the target range counter 56 to count up, thereby increasing the range signal and causing the position of the range gate pulses 70 to shift to a later time. Conversely, if the integrated energy value from integrator 52 is greater than the threshold value, the position of the range gate pulses 70 was too late (i.e., was present after the return pulses were detected), causing the integrated energy values of the preceding N detected pulses $P_R$ to exceed the threshold value. This event occurs when the measurement distance represented by the position of the range gate pulses 70 is greater than the actual distance being measured. In response to a received integrated energy value which is greater than the threshold value, the threshold detector 54 outputs a count direction signal which causes the target range counter 56 to count down, thereby decreasing the range signal and causing the position of the range gate pulses 70 to shift to an earlier time. The above described operation of range gate positioning circuit 24, when performed iteratively on several sequential groups of N return pulses $P_R$, causes the range signal to "lock" onto a value that represents the distance between the transducer 20 and the load 12. In the embodiment shown in FIG. 2, the range signal is processed by filter 80 to provide the range information signal. The range gate positioning circuit 24 functions as a closed loop range tracking servo, ensuring that the first or nearest object such as load 12 is acquired and tracked. More distant objects are effectively filtered out.

Distance measuring system 10 offers a number of important advantages. It can be relatively inexpensively implemented in digital circuitry such as a digital signal processor or a gate array. Alternatively, the system can be implemented using discrete analog or digital circuit elements. The distance measurement signal provided by the system is highly accurate and reliable. As well as being insensitive to temperature variations, the system exhibits a high degree of interference immunity. The design is versatile and can be easily adapted to a wide range of measurement distance applications. The system can also be easily interfaced to electronic air brake systems on railroad cars. When used as a load size sensor and connected to the air brake system, the degree of force applied to the brakes can be automatically varied to correspond to the load to improve braking performance. The system also can be adapted and coded for different types of railroad cars to enable the output signal to be converted directly to the desired braking force relationship.

Although the present invention has been described with reference to preferred embodiments, those skilled in the art will recognize that changes can be made in form and detail without departing from the spirit and scope of the invention.

What is claimed is:

1. An ultrasonic system for providing information representative of railroad car loads, including:

an ultrasonic transducer located within a railroad car for producing a transmitted ultrasonic pulse beam to be directed at a load in a railroad car, and for receiving a return pulse beam from the load;

a pulse generation and detection circuit coupled to the transducer, for causing the transducer to produce the transmitted pulse beam and for detecting the return pulse beam; and a measurement circuit coupled to the pulse generation and detection circuit, for generating a measurement signal representative of the load as a function of the time delay between the transmitted and return pulse beams.

2. The ultrasonic system of claim 1 wherein the measurement circuit generates a distance measurement signal representative of the distance between the ultrasonic transducer and the railroad car loads.

3. The ultrasonic system of claim 1 wherein the pulse generation and detection circuit includes a circuit for producing and detecting a pseudo-random transmitted ultrasonic pulse beam.

4. The ultrasonic system of claim 1 wherein the measurement circuit includes a servo loop.

5. The ultrasonic system of claim 1 wherein the measurement circuit includes a range gate positioning circuit.

6. The ultrasonic system of claim 5 wherein the range gate positioning circuit includes:

a target range counter for producing a range signal representative of the distance between the ultrasonic transducer and railroad car load;

a range gate positioning counter coupled to the target range counter, for initiating the generation of range gate pulses and for ending the range gate pulses as a function of the range signal;

a range gate coupled to the range gate positioning counter and the transducer, for transmitting the return pulse beam as a function of the range gate pulses;

an integrator coupled to the range gate for integrating the transmitted return pulse beam; and a threshold detector coupled to the integrator and the target range counter, for comparing the integrated return pulse beam to a threshold value and controlling the target range counter as a function of the comparison.

7. The ultrasonic system of claim 6 wherein:

the integrator integrates a predetermined number of return pulses in the return pulse beam; and the target range counter updates the range signal after the integrator integrates the predetermined number of pulses.

8. The ultrasonic system of claim 5 and further including a temperature compensation circuit coupled to the range gate positioning circuit.

9. The ultrasonic system of claim 1 and further including a temperature compensation circuit coupled to the measurement circuit.

* * * * *

UNITED STATES PATENT AND TRADEMARK OFFICE
CERTIFICATE OF CORRECTION

PATENT NO. : 6,323,441 B1
DATED : November 27, 2001
INVENTOR(S) : James Robert Hager, Curtis James Petrich and Thomas Richard Jicha It is certified that error appears in the above-identified patent and that said Letters Patent is hereby corrected as shown below:

<u>Column 6,</u>
Line 9, after "located" insert -- entirely --.

Signed and Sealed this

Thirtieth Day of July, 2002

Attest:

JAMES E. ROGAN
Attesting Officer     Director of the United States Patent and Trademark Office